April 4, 1944. A. J. HOLDER 2,346,073
GROUND BREAKING ATTACHMENT FOR LISTER PLOWS
Filed Sept. 16, 1942 2 Sheets-Sheet 1
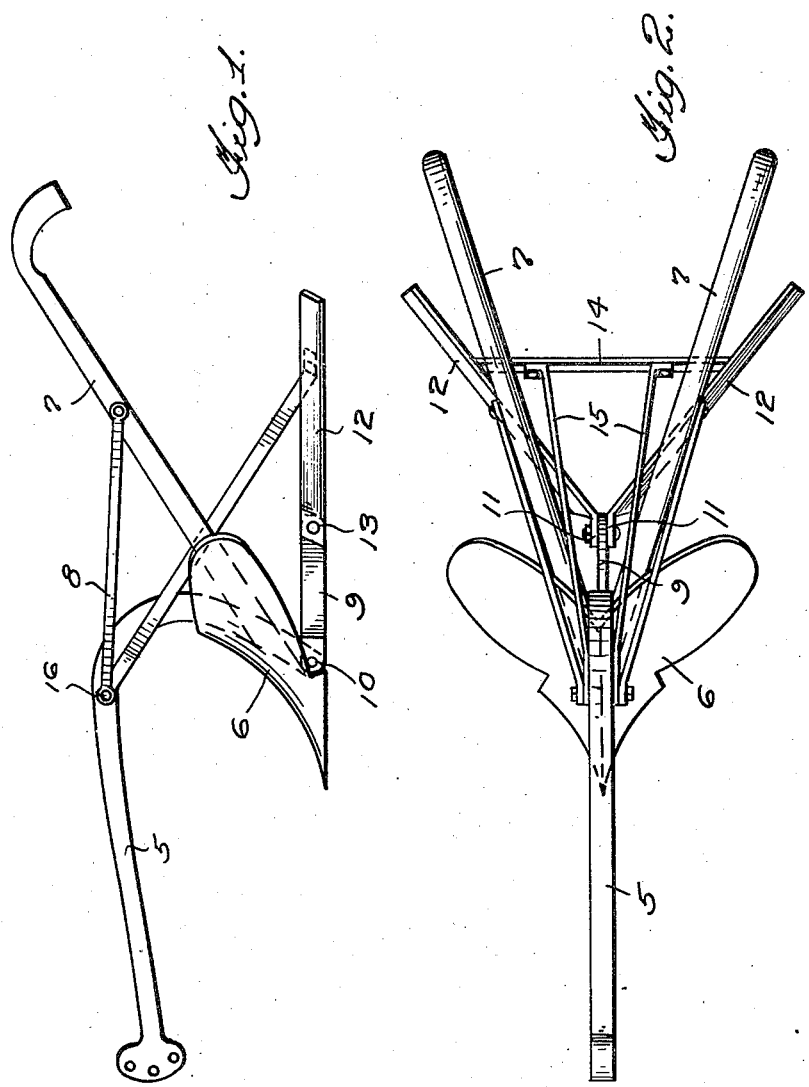
Inventor
Andrew J. Holder
By Clarence A. O'Brien
and Harvey B. Jacobson
Attorneys April 4, 1944. A. J. HOLDER 2,346,073
GROUND BREAKING ATTACHMENT FOR LISTER PLOWS
Filed Sept. 16, 1942 2 Sheets-Sheet 2

Inventor
Andrew J. Holder.

By Clarence A. O'Brien
and Harvey B. Jacobson
Attorneys

Patented Apr. 4, 1944

2,346,073

UNITED STATES PATENT OFFICE 2,346,073

GROUND BREAKING ATTACHMENT FOR LISTER PLOWS

Andrew J. Holder, Elgin, Tex.

Application September 16, 1942, Serial No. 458,537

2 Claims. (Cl. 97—133)

The present invention relates to new and useful improvements in soil breaking attachment for lister plows, the invention embodying a sweep construction in the form of blades extending rearwardly and outwardly from opposite sides of the plow and designed to run under the soil behind the plow and break the soil that the plow fails to turn.

An important object of the present invention is to provide a lister plow attachment of this character of simple and practical construction, which is efficient and reliable in performance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view.

Figure 2 is a top plan view.

Figure 3:
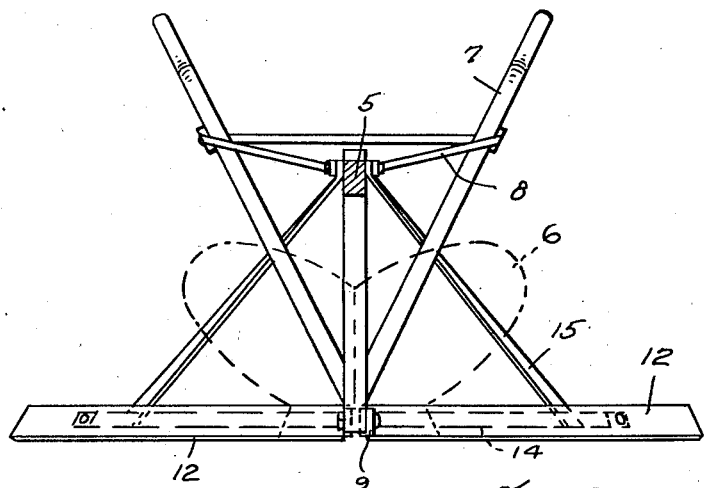
Figure 3 is a front elevational view with the plow shown in dotted lines and with parts shown in section.
Figure 4:
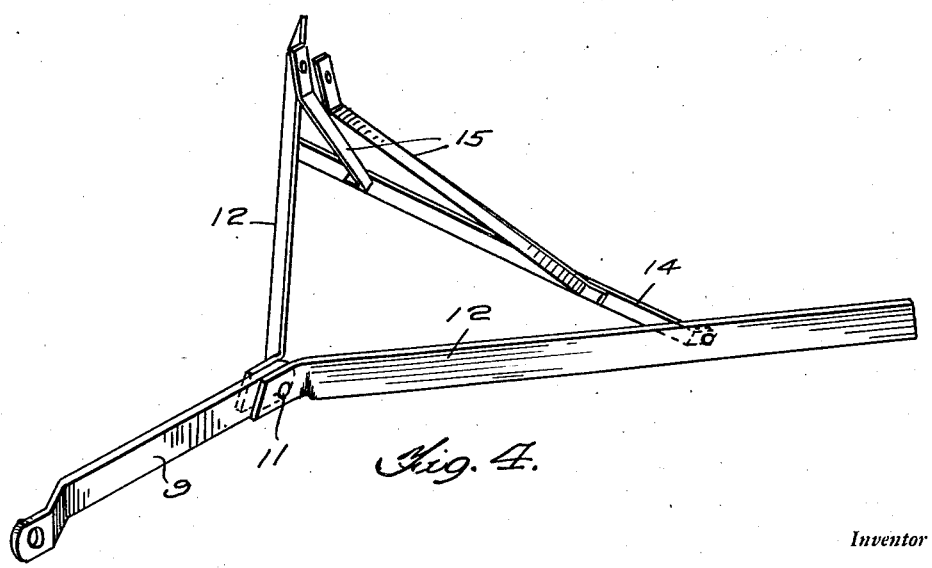
Figure 4 is a perspective view of the soil breaking attachment.

Referring now to the drawings in detail wherein for the purpose of illustration I have disclosed a preferred embodiment of the invention the numeral 5 designates the plow stock or beam of conventional construction and to which a lister plow 6 is attached. The plow also includes the rearwardly diverging handles 7 secured to the beam adjacent its lower end and also connected to the beam by means of brace members 8.

A longitudinally extending bar 9 has its front end connected to the lower end of the beam at the heel of the plow by a bolt 10, the rear end of the bar 9 being positioned between the parallel front end 11—11 of a pair of blade members 12—12 which are inclined outwardly in diverging relation toward opposite sides of the plow from the parallel front ends 11 of the blades. The parallel front ends 11 are secured to the rear end of the bar 9 by means of a bolt 13.

At the junction of the front end portions 11 with the blade portions 12 the blades are twisted to incline the front surface of the blades rearwardly to facilitate the riding of the soil over the upper edge of the blades.

The blades 12 are connected at an intermediate portion by a brace member 14 and a pair of brace members 15—15 extend from the brace member 14 in a forwardly and upwardly inclined direction for attaching to the plow beam by the bolt 16 which is also used for attaching the handle brace 8 thereto.

The brace members 15 support the blades 12 and the bar 9 in a horizontal position substantially in the plane of the bottom of the plow.

It will be apparent that the blades 12 are adapted to ride under the soil behind the plow 6 and will break up any soil not turned by the plow.

It is believed the details of construction, advantages and manner of use of the device will be readily understood from the foregoing without further detailed explanation.

Having described the invention, what is claimed as new is:

1. A ground breaking attachment for plows comprising a pair of rearwardly and outwardly extending blades having longitudinally extending parallel front ends, an arm connecting said front ends of the blades to the plow at the heel portion thereof, said arm being disposed horizontally in the plane of the bottom of the plow, said blades being twisted at the junction of their attached front ends to position the front face of the blades in a rearwardly inclined angle, a transverse brace connecting the blades adjacent their rear ends, and braces connected to the first named brace adjacent the ends of the latter and extending forwardly therefrom and attached to the beam of the plow at a point above the latter.

2. A ground breaking attachment for plows comprising a longitudinally extending arm connected at its front end to the heel of the plow and projecting rearwardly therefrom at the center of the plow in the horizontal plane of the bottom thereof, a pair of blades attached to the rear end of the arm and extending rearwardly and outwardly therefrom in diverging relation to each other in the horizontal plane of the arm, a transverse brace connecting the blades adjacent their rear ends, and a pair of longitudinal braces connected at their rear ends to the transverse brace adjacent the ends of the latter, said longitudinal braces extending forwardly and upwardly and connected at their front ends to the beam of the plow.

ANDREW J. HOLDER.